United States Patent [19]
Fujiyoshi et al.

[11] 3,867,480
[45] Feb. 18, 1975

[54] POLYESTER POWDER COATING COMPOSITION

[75] Inventors: Kanji Fujiyoshi; Yutaka Mizumura; Junji Sono, all of Otsu, Japan

[73] Assignee: Toyo Boseki Kabushiki Kaisha, Kita-ku, Osaka-shi, Osaka-fu, Japan

[22] Filed: June 25, 1973

[21] Appl. No.: 373,219

[30] Foreign Application Priority Data

June 30, 1972 Japan............................ 47-65953
June 30, 1972 Japan............................ 47-65954
Jan. 29, 1973 Japan............................ 48-12202

[52] U.S. Cl............. 260/873, 117/21, 117/93.4 R, 117/105.2, 117/128.4
[51] Int. Cl............................................. C08g 39/10
[58] Field of Search............ 260/873, 75 T; 117/21, 117/16, 89.5 A

[56] References Cited
UNITED STATES PATENTS

| | | | |
|---|---|---|---|
| 3,182,073 | 5/1965 | Loncrini............................ | 260/75 T |
| 3,290,411 | 12/1966 | Tsuji et al.......................... | 260/873 |
| 3,591,659 | 7/1971 | Brinkmann et al................ | 260/873 |

Primary Examiner—Morris Liebman
Assistant Examiner—T. Pertilla
Attorney, Agent, or Firm—Kaufman & Kramer

[57] ABSTRACT

A polyester powder coating composition comprising
(1) a polyester which is prepared by reacting (a) an aromatic dicarboxylic acid or its lower alkyl ester.
(b) an aliphatic or alicyclic diol, and
(c) at least one of the acids selected from the group consisting of
(i) an organic acid having at least three carboxy groups in the molecule or its functional derivative,
(ii) a hydroxyaliphatic carboxylic acid, and
(iii) an aliphatic dicarboxylic acid;
(2) an organic acid anhydride having at least two acid anhydride groups in the molecule; and
(3) a polyacrylic acid ester,
said polyester composition being able to form a paint film having excellent properties, such as excellent gloss, smoothness, impact strength and heat resistance.

8 Claims, No Drawings

POLYESTER POWDER COATING COMPOSITION

The present invention relates to a thermosetting polyester resin and a powder coating composition thereof. More particularly, it relates to a polyester based pulverizing resinious composition for powder coating which can form a paint film having excellent properties, such as excellent gloss, smoothness, impact strength and heat resistance.

As the powder coating composition, there has, hitherto, been known those comprising predominantly thermoplastic resin such as polyethylene and polyvinyl chloride, and thermosetting compositions comprising predominantly thermosetting resin such as epoxy resin. The latter thermosetting compsition comprising predominantly thermosetting resin has advantages that the film formed therefrom has excellent heat resistance and chemical resistance, but on the other hand, it has disadvantages that the resin shows inferior fluidity in the film forming step and therefore it can hardly form a smooth and fine film.

It has been studied to find a polyester powder coating composition having excellent properties, such as gloss, smoothness, heat resistance, impact strength and chemical resistance, and then it has been found that a composition comprising (1) a specific polyester, (2) an organic acid anhydride and (3) a polyacrylic acid ester can form a film having excellent properties.

The polyester composition for powder coating of the present invention comprises (1) a polyester, (2) an organic acid anhydride having at least two acid anhydride groups in the molecule (i.e. polyanhydride) and (3) a polyacrylic acid ester. The composition may further contain (4) a sulfur-containing compound as the thermosetting reaction catalyst.

The polyester (1) is prepared by reacting
(a) an aromatic dicarboxylic acid or its lower alkyl ester,
(b) an aliphatic or alicyclic diol, and
(c) at least one of the acids selected from the group consisting of
(i) an organic acid having at least three carboxy groups in the molecule or its functional derivative.
(ii) a hydroxyaliphatic carboxylic acid, and
(iii) an aliphatic dicarboxylic acid.

That is, it can be prepared by reacting three components of (a), (b) and (i), or (a), (b) and (ii), or four components of (a), (b), (i) and (ii), or (a), (b), (i) and (iii), or five components of (a), (b), (i), (ii) and (iii).

The suitable examples of the aromatic dicarboxylic acid or its lower alkyl ester may be terephthalic acid, isophthalic acid or orthophthalic acid, or its lower alkyl ester, such as methyl, ethyl, propyl, isopropyl, butyl, sec-butyl or tert-butyl ester. The acids or the lower alkyl ester thereof may be partially replaced by naphthalenedicarboxylic acid, or a substituted terephthalic, isophthalic or orthophthalic acid or the lower alkyl ester thereof.

The suitable examples of the aliphatic or alicyclic diol may be ethyleneglycol, propyleneglycol, trimethyleneglycol, butanediol, pentanediol, hexanediol, diethyleneglycol, dipropyleneglycol, neopentylglycol, cyclohexanediol, cyclopentanediol, cyclohexanedimethanol, or the like.

As the suitable examples of the organic acid having at least three carboxy groups in the molecule or its functional derivative, there may be trimellitic acid, trimellitic anhydride, pyromellitic acid, pyromellitic dianhydride, propane-1,2,3-tricarboxylic acid, butane-1,2,3,4-tetracarboxylic acid, or the like. Among these organic acids, the most suitable one is trimellitic anhydride.

The suitable examples of the hydroxyaliphatic carboxylic acid may be lactic acid, glyceric acid, malic acid, tartaric acid, citric acid, or the like. The suitable examples of the aliphatic dicarboxylic acid may be oxalic acid, succinic acid, adipic acid, azelaic acid, sebacic acid, or the like. The present polyester can be prepared by conventional methods, such as ester exchange method or direct esterification method, and the preparation there may optionally used conventional catalyst, modifiers and stabilizers. The suitable proportions of each components (a), (b), (i), (ii) and (iii) in preparing the polyester may be in the following ranges. That is, the molar ratio of (a)/(i), (a)/(ii), (a)/(i)+(iii), (a)/(i)+(ii) and (a)/(i)+(ii)+(iii) may be each in a range of 70/30 to 98/2, and the molar ratio of the total acid/total glycol (diol) may be in a range of 1/1.1 to 1/2.0.

The polyester thus obtained is admixed with a polyanhydride (2) and a polyacrylic acid ester (3) to give the desired powder coating composition.

As the suitable examples of the polyanhydride (2), there may be pyromellitic dianhydride, 2,3,6,7-naphthalenetetracarboxylic dianhydride, 3,3',4,4'-diphenyltetracarboxylic dianhydride, 2,2',3,3'-diphenyltetracarboxylic dianhydride, 1,2,5,6-naphthalenetetracarboxylic dianhydride, 2,2-bis(3,4-dicarboxyphenyl)propane dianhydride, 1,2,3,4-cyclopentanetetracarboxylic dianhydride, benzophenonetetracarboxylic dianhydride, bis(3,4-dicarboxyphenyl)ether dianhydride, 3,4-,9,10-perylenetetracarboxylic dianhydride, ethylene bis(trimellitate) dianhydride, hydroquinone bis(trimellitate) dianhydride, bisphenol A bis(trimellitate) dianhydride, p,p'-phenylene bis(thiotrimellitate) dianhydride, glycerine tris(trimellitate) trianhydride, trimethylolethane trimellitate trianhydride, or the like.

The polyacrylic acid ester (3) may be a polymer of alkyl acrylate, and the suitable examples may be poly(methyl acrylate), poly(ethyl acrylate), poly(butyl acrylate), poly-(2-ethylhexyl acrylate), poly(methoxyethyl acrylate), poly-(lauryl acrylate) or the like. Among these, the most suitable one is poly(ethyl acrylate).

The proportions of the polyanhydride (2) and the polyacrylic acid ester (3) to the polyester (1) may be preferably in a range of 5 to 15 parts by weight and in a range of 0.1 to 1 part by weight, respectively on the basis of 100 parts by weight of the polyester (1).

The present polyester powder coating composition can be prepared by a conventional method, for instance, polyester, polyanhydride and polyacrylic acid ester are homogeneously compounded by a mixer, a roll mill or a kneader, and then the resulting compounded material is ground or pulverized to the desired small particle size. The suitable particle size is 100μ or less.

To the present powder coating composition, there may be further admixed a sulfur-containing compound (4) as a thermo-setting reaction catalyst in addition to the polyester (1), the polyanhydride (2) and the polyacrylic acid ester (3) at the compounding operation.

The sulfur-containing compound (4) may be the one selected from the group consisting of dialkyldithiocarbamic acid metal salt, tetralkylthiuram mono or disulfide, 2-mercaptobenzimidazole or its metal salt, 2-mercaptoimidazoline or its metal salt and thiourea compound.

The suitable examples of the dialkyldithiocarbamic acid metal salt may be sodium or zinc dimethyldithiocarbamate, sodium or zinc diethyldithiocarbamate, sodium, zinc, calcium or magnesium dibutyldithiocarbamate, or the like. The suitable examples of the tetraalkylthiuram mono or disulfide may be tetramethylthiuram monosulfide, tetramethylthiuram disulfide, tetraethylthiuram disulfide, tetrabutylthiuram disulfide, or the like. The suitable examples of the 2-mercaptobenzimidazole metal salt may be sodium, zinc or calcium salt of 2-mercaptobenzimidazole. The suitable examples of the 2-mercaptoimidazoline metal salt may be sodium, zinc or calcium salt of 2-mercaptoimidazoline. The thiourea compound has the following formula:

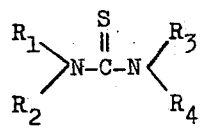

wherein $R_1$, $R_2$, $R_3$ and $R_4$ are each hydrogen, an aliphatic or aromatic group, and the suitable examples may be tetramethylthiourea, dibenzylthiourea, dicyclohexylthiourea, di-o-tolylthiourea, ethylenethiourea, or the like.

The proportion of the sulfur-containing compound may be in a range of 0.1 to 1 part by weight on the basis of 100 parts by weight of the polyester. The sulfur-containing compound specified above may be simultaneously admixed with other components in the preparation of the powder coating composition.

To the present powder coating composition, there may be optionally added pigments, fillers, or modifiers, such as benzoin, benzophenone, benzilic acid, para-phenylphenol, dicumyl peroxide, 2,5-dimethyl-2,5-di(hydroperoxy)hexane, stearyl alcohol, or the like at the compounding operation.

The powder coating composition of the present invention can be applied to various substrates by conventional methods, such as flame spray coating, fluidized bed coating, electrostatic spray coating, and the like. For instance, according to electrostatic spray coating method, the finely divided powder of the present composition is homogeneously attracted on the surface of the article to be coated by electrostatic action and subsequently the coated article is heated at 150° to 250°C for 10 to 30 minutes in a hot air dryer to cure the coating composition. When the composition includes a sulfur-containing compound (4), the temperature of the baking is enough at 150° to 200°C.

The present powder coating composition can form a film having excellent surface and mechanical amd chemical properties and therefore it is suitable for top-coating of body or parts of automobile, of building materials for outside ornament.

The preparation of the polyester and the powder coating composition of the present invention are illustrated by the following examples but the present invention is not limited thereto. In the Examples, "part" means part by weight, and the methods for measurement of the properties of the film are as follows:

Gloss: it is shown by light reflector coefficient (%) at 60° reflection.

Impact strength: it is measured by using Du Pont impact tester.

Erichsen ductility test: it is carried out by using Erichsen capping tester.

Smoothness: it is rated on the results of observation of the surface of film with the naked eye.

Weatherability: it is carried out by irradiating the film with Xenon weather-ometer (ASTM E 240).

Corrosion resistance: it is carried out according to the provision of ASTM B 117-64 (salt spray test).

EXAMPLE 1

Into a glass made reaction vessel provided with stirrer, thermometer and reflux condenser for removing methanol were added dimethyl terephthalate (a: 100 g), ethyleneglycol (b: 32.6 g), neopentylglycol (b: 36.5 g) and zinc acetate (0.045 g, as a catalyst). The temperature of the mixture was gradually risen. The distillation of methanol was started at 130°C. The mixture was further heated up to 230°C for the period of 3.5 hours. To the mixture was added triphenyl phosphite (0.132 g) and 6 minutes after the addition trimellitic anhydride (i: 24.8 g) was further added thereto. The temperature of the mixture was risen up to 250°C for the period of 30 minutes and the mixture was further heated at 250° for 30 minutes to subject it to esterification reaction. After the reaction, the pressure of the vessel was lowered to 20 mmHg for period of 30 minutes and further lowered to 4 mmHg and then maintained at the reduced pressure for 30 minutes to remove unreacted glycols.

The polyester thus obtained was faint yellow, transparent amorphous resin and has a sintering point of 72° to 74°C which was measured by a micro melting point apparatus and a molecular weight of 1700 which was measured by a vapor pressure osmometer. The molar ratio of the acid components (a)/(i) was 4/1, ethyleneglycol/neopentylglycol of the component (b) was 6/4 by mol and the total acid/total glycol was 1/1.4 by mol.

EXAMPLE 2

In the same manner as described in Example 1 except that citric acid (ii: 24.8 g) was used instead of trimellitic anhydride (i: 24.8 g) there was obtained amorphous polyester having a sintering point of 45° to 52°C and a (a)/(ii) weight of 1600. The amorphousness of the product is very meaningful and may be due to the facts that two kinds of glycol components: ethyleneglycol and neopentylglycol are used together. The molar ratio of the acid components (a)/(ii)/ was 4/1, ethyleneglycol/neopentylglycol of the glycol component (b) was 6/4 by mol and the total acid/total glycol was 1/1.4 by mol.

EXAMPLE 3

Into a reaction vessel similar to that in Example 1 were added dimethyl terephthalate (a: 1273 g), ethyleneglycol (b: 399 g), neopentylglycol (b: 446 g) and zinc acetate (0.577 g). The temperature of the mixture was gradually risen. The distillation of methanol was started at 130°C. The mixture was further heated up to 230°C for the period of 3.5 hours. To the mixture were added citric anhydride (ii: 61.5 g), trimellitic anydride (i: 215 g), and triphenyl phosphite (1.68 g). The mixture was heated for 60 minutes and then further heated with reducing the pressure to 4 mmHg for period of 30 minutes by a vacuum pump and thereby the reaction was completed.

The polyester thus obtained had a sintering point of 70° to 85°C and a molecular weight of 2100. The molar ratio of the acid components: (a)/(i)/(ii) was 81/14/5, ethyleneglycol/neopentylglycol of the glycol components was 56/44 by mol and the total acids/total glycols was 1/1.4 by mol.

EXAMPLE 4

Into 2 liter flask provided with distillation tube and thermometer were added dimetyl terephthalate (a: 1071 g), ethyleneglycol (b: 443 g), neopentylglycol (b: 318 g) and zinc acetate (0.526 g, as a catalyst). The temperature of the mixture was gradually risen and the mixture was subjected to esterification reaction for 4 hours. The distillation of methanol was started at 130° to 140°C. The mixture was further heated up to 230°C and thereafter allowed to stands until the distillation tube was cooled. After the ester exchange reaction, to the reaction mixture were added sebacic acid (iii: 60.6 g) and trimellitic anhydride (i: 34.6 g) and the mixture was heated up to 250°C for the period of 30 minutes and then maintained at the temperature for 30 minutes to subject it to esterification reaction. After the esterification reaction, the pressure of the vessel was gradually reduced to 3 mmHg at 250°C for the period of 50 minutes. After the rough vacuum, the mixture was subjected to polymerization reaction for 40 minutes under full vacuum (0.3 to 0.5 mmHg).

The polyester thus obtained was faint yellow and transparent and had a sintering point of 70° to 72°C and a molecular weight of 3100. In the above example, the molar ratio of the acid components: (a)/(i)/(iii) was 92/3/5, ethyleneglycol/neopentylglycol of the glycol components was 7/3 by mol and the total acids/total glycols was 1/1.7 by mol.

EXAMPLE 5

The polyester (100 parts) obtained in Examples 2 and 3 was mixed with a polyanhydride, polyacrylic acid ester, titanium oxide in a proportion as mentioned in Table 1. The mixture was roughly mixed by Henschel mixer and then compounded by twin extruder to give the homogeneous compounded composition. The composition was pulverized by hammer mill and then passed through screen to cellect the particles having a particle size of 100 mesh or less which were used for powder coating.

Table 1

| No. of composition | Example No. of polyester | Polyanhydride Kind* | Part by weight | TiO₂ (Part by weight) | Polyacrylic acid ester Kind* | Part by weight |
|---|---|---|---|---|---|---|
| P-1 | Example 2 | ETMA | 5.0 | 20 | PEA | 0.5 |
| P-2 | do. | do. | 7.0 | 30 | do. | 0.5 |
| P-3 | do. | do. | 10.0 | 30 | do. | 0.5 |
| P-4 | do. | CPTA | 5.0 | 20 | PBA | 0.5 |
| P-5 | do. | do. | 10.0 | 30 | do. | 0.5 |
| P-6 | do. | PMDA | 5.0 | 20 | PEA | 0.3 |
| P-7 | do. | do. | 10.0 | 40 | do. | 0.3 |
| P-8 | Example 3 | ETMA | 7.0 | 30 | do. | 0.5 |
| P-9 | do. | do. | 10.0 | 30 | do. | 0.5 |
| P-10 | do. | CPTA | 6.0 | 30 | do. | 0.5 |
| P-11 | do. | do. | 9.0 | 30 | do. | 0.5 |
| P-12 | do. | PMDA | 7.0 | 30 | do. | 0.5 |
| P-13 | do. | do. | 10.0 | 50 | do. | 0.7 |
| P-14 | do. | do. | 7.0 | 30 | do. | 0 |

[Note]: *) The abbreviations mean as follows:
ETMA: Ethylene bis(trimellitate)dianhydride
CPTA: Cyclopentanetetracarboxylic dianhydride
PMDA: Pyromellitic dianhydride
PEA: Poly(ethyl acrylate)
PBA: Poly(butyl acrylate)

The powder coating compositions of P-1 to P-14 were sprayed onto a cold rolled steel plate (0.8m/m×70 m/m×150m/m; treated with Bonderite 891) by using Ransburg type electrostatic powder sprayer and baked at 180° to 220°C for 20 to 40 minutes by using an electric air convection heater to give a film having 100 to 120 μ in thickness. The properties of the film thus obtained are shown in Table 2.

Table 2

| No. of composition | Baking condition Temp. × Time (°C) (min.) | Erichsen ductility test (m/m) | impact strength (cm) | Gloss (%) |
|---|---|---|---|---|
| P-1 | 180 × 30 | 3 | 10 | 90 |
|  | 180 × 40 | 3 | 30 | 90 |
|  | 200 × 30 | 5 | 30 | 90 |
| P-2 | 200 × 30 | 5 | 40 | 90 |
|  | 220 × 20 | 5 | 20 | 90 |
| P-3 | 180 × 20 | 3 | 30 | 90 |
| P-4 | 220 × 30 | 3 | 40 | 85 |
| P-5 | 180 × 40 | 3 | 20 | 87 |
|  | 200 × 20 | 3 | 30 | 85 |
| P-6 | 180 × 40 | 3 | 40 | 93 |
|  | 200 × 30 | 7 | 40 | 95 |
| P-7 | 180 × 30 | 3 | 30 | 90 |
|  | 200 × 30 | 7 | 30 | 90 |
| P-8 | 200 × 40 | 5 | 30 | 90 |
|  | 220 × 30 | 5 | 40 | 90 |
| P-9 | 180 × 30 | 3 | 30 | 90 |
|  | 220 × 30 | 5 | 30 | 90 |
| P-10 | 200 × 40 | 5 | 30 | 85 |
|  | 220 × 30 | 5 | 40 | 85 |
| P-11 | 200 × 30 | 5 | 40 | 85 |
| P-12 | 180 × 30 | 3 | 30 | 90 |
|  | 220 × 20 | 7 | 30 | 90 |
| P-13 | 180 × 30 | 5 | 40 | 90 |
|  | 200 × 20 | 7 | 40 | 90 |
| P-14 | 180 × 30 | 0 | 10 | 40 |
|  | 200 × 30 | 0 | 10 | 45 |
|  | 250 × 30 | 0 | 10 | 45 |

As made clear from the test results, the film formed from the present composition showed excellent properties. On the contrary, the composition P-14 including no polyacrylic acid ester, which is excluded from the present invention, did not give such excellent film.

EXAMPLE 6

The polyester (100 parts) obtained in Example 4 was mixed with pyromellitic dianhydride, a sulfur-containing compound, polyacrylic acid ester, titanium oxide and other additives in a proportion as mentioned in Table 3. The mixture was roughly mixed by Henschel mixer and then compounded by twin extruder to give the homogeneously compounded composition. The composition was pulverized by hammer mill and then passed through screen to collect the particles having a particle size of 100 mesh or less which were used for powder coating.

Table 4

| No. of composition | Baking temperature (°C) | Erichsen ductility test (m/m) | Impact strength (cm) | Gloss (%) | Smoothness |
|---|---|---|---|---|---|
| T-0 | 170 | 0 | 10 | 90 | O |
|  | 180 | 0 | 10 | 90 | O |
|  | 200 | 5 | 30 | 95 | O |
|  | 220 | 7 | 40 | 96 | O |
| T-1 | 170 | 7 | 30 | 89 | O |
|  | 180 | 7 | 50 | 94 | O |
| T-2 | 170 | 5-7 | 30 | 89 | O |
|  | 180 | 7 | 40 | 94 | O |
| T-3 | 170 | 7 | 40 | 89 | O |
|  | 180 | 7 | 50 | 92 | O |
| T-4 | 180 | 5-7 | 30 | 93 | O |
| T-5 | 180 | 5-7 | 30 | 93 | O |
| T-6 | 180 | 7 | 30 | 89 | O |
| T-7 | 170 | 5-7 | 30 | 94 | O |
|  | 180 | 7 | 40 | 97 | O |
| T-8 | 170 | 5-7 | 30 | 93 | O |
|  | 180 | 7 | 30 | 97 | O |
|  | 190 | 7 | 40 | 97 | O |
| T-9 | 180 | 7 | 40 | 94 | OO |
| T-10 | 180 | 7 | 30 | 91 | O |
| T-11 | 180 | 7 | 25 | 91 | O |
| T-12 | 170 | 7 | 40 | 87 | O |
|  | 180 | 7 | 45 | 93 | O |
| T-13 | 180 | 5 | 25 | 92 | OO |
| T-14 | 180 | 7 | 30 | 95 | OO |
| T-15 | 180 | 7 | 35 | 92 | OO |
| T-16 | 170 | 7 | 40 | 94 | OO |
|  | 180 | 7 | 45 | 96 | OO |
|  | 190 | 7 | 45 | 96 | OO |
| T-17 | 180 | 7 | 30 | 89 | O |
| T-18 | 180 | 7 | 30 | 92 | O |

Table 3

| No. of composition | Pyromellitic dianhydride | Sulfur-containing compound Kind* | Sulfur-containing compound Part | Poly-(ethyl acrylate) | Titanium oxide | Other additives Kind* | Other additives part |
|---|---|---|---|---|---|---|---|
| T-0 | 7.0 | — | — | 0.5 | 20 | — | — |
| T-1 | 7.0 | BZ | 0.5 | 0.5 | 20 | BP | 0.5 |
| T-2 | 7.0 | PZ | 0.5 | 0.5 | 20 | BP | 0.5 |
| T-3 | 7.0 | BZ | 0.5 | 0.5 | 20 | BZN | 0.3 |
| T-4 | 7.0 | PZ | 0.5 | 0.5 | 20 | BZN | 0.5 |
| T-5 | 7.0 | TTD | 0.5 | 0.5 | 20 | BZN | 0.5 |
| T-6 | 7.0 | PZ | 0.5 | 0.5 | 20 | BZN | 0.3 |
| T-7 | 7.5 | PZ | 0.5 | 0.5 | 20 | BZN / SAL | 0.3 / 0.5 |
| T-8 | 7.0 | MB | 0.3 | 0.5 | 20 | — | — |
| T-9 | 7.5 | MB | 0.3 | 0.5 | 20 | BZN / SAL | 0.5 / 0.5 |
| T-10 | 7.5 | PZ | 0.5 | 0.5 | 20 | BZN / SAL | 0.5 / 0.5 |
| T-11 | 7.5 | PZ | 0.5 | 0.5 | 20 | BZN / PPP | 0.5 / 1.0 |
| T-12 | 7.5 | BZ | 0.5 | 0.5 | 20 | BZN / AHPO | 0.5 / 1.0 |
| T-13 | 7.0 | MB | 0.5 | 0.5 | 20 | BZN | 1.0 |
| T-14 | 7.5 | MB | 0.5 | 0.5 | 20 | BZN | 1.0 |
| T-15 | 7.3 | MB | 0.5 | 0.5 | 30 | BZN | 1.0 |
| T-16 | 7.5 | MB | 0.5 | 0.5 | 20 | BZN | 1.5 |
| T-17 | 7.5 | MB | 0.5 | 0.5 | 20 | BA | 1.0 |
| T-18 | 7.5 | MB | 0.5 | 0.5 | 20 | DCP / SAL | 1.0 / 1.0 |

[Note]: *The abbreviations mean as follows:
BZ: Zinc dibutyldithiocarbamate
PZ: Zinc dimethyldithiocarbamate
TTD: Tetramethylthiuram disulfide
MB: Mercaptobenzimidazole
BP: Benzophenone
BZN: Benzoin
SAL: Stearyl alcohol
PPP: Para-phenylphenol
AHPO: 2,5-Dimethyl-2,5-di(hydroperoxy)hexane
BA: Benzilic acid
DCP: Dicumyl peroxide The powder coating compositions of T-0 to T-18 were sprayed onto a cold rolled steel plate (0.8m/m×70m/m×150m/m, treated with Bonderite 891) by using Ransburg type electrostatic powder sprayer and baked at 170° to 220°C for 20 minutes by using an electric air convection heater to give a film having 120μ in thickness. The properties of the film thus obtained are shown in Table 4.

Moreover, the films obtained in the above example showed excellent properties that they did not lower the gloss even after 1000 hours in weatherability test and that they did not show any defect even after 300 hours in corrosion resistance test. As a contrast, there was prepared a composition without polyacrylic acid ester (i). The composition could not form a uniform film which showed inferior gloss and smoothness.

What is claimed is:

1. A polyester powder coating composition comprising 1. a polyester which is prepared by reacting
      a. an aromatic dicarboxylic acid or its lower alkyl ester,
      b. an aliphatic or alicyclic diol, and
      c. at least one of the acids selected from the group consisting of
         i. an organic acid having at least three carboxy groups in the molecule or its functional derivative,
         ii. a hydroxyaliphatic carboxylic acid, and
         iii. an aliphatic dicarboxylic acid;
   2. an organic acid anhydride having at least two acid anhydride groups in the molecule; and
   3. a polyacrylic acid ester.

2. The polyester powder coating commposition according to claim 1, wherein the proportions of the components are in a range of 5 to 15 parts by weight of the organic polyanhydride (2) and in a range of 0.1 to 1 part by weight of the polyacrylic acid ester (3) on the basis of 100 parts by weight of the polyester (1).

3. The polyester powder coating composition according to claim 1, wherein the proportion of the aromatic dicarboxylic acid or its lower alkyl ester (a) to the acid components (c) in the polyester (1) is in a range of 70/30 to 98/2 and the molar ratio of the total acid/total diol is in a range of 1/1.1 to 1/2.0.

4. The polyester powder coating composition according to claim 1, wherein the aromatic dicarboxylic acid or its lower alkyl ester is a member selected from the group consisting of terephthalic acid, isophthalic acid, orthophthalic acid and the ester of a lower alkyl selected from the group consisting of methyl, ethyl, propyl, isopropyl, butyl, sec-butyl and tert-butyl; the aliphatic or alicyclic diol is a member selected from the group consisting of ethyleneglycol, propyleneglycol, trimethyleneglycol, butanediol, pentanediol, hexanediol, diethyleneglycol, dipropyleneglycol, neopentylglycol, cyclohexanediol, cyclopentanediol and cyclohexanedimethanol; the organic acid having at least three carboxy groups in the molecule or its functional derivative is a member selected from the group consisting of trimellitic acid, trimellitic anhydride, pyromellitic acid, pyromellitic dianhydride, propane-1,2,3-tricarboxylic acid and butane-1,2,3,4-tetracarboxylic acid; the hydroxyaliphatic carboxylic acid is a member selected from the group consisting of lactic acid, glyceric acid, malic acid, tartaric acid and citric acid; and the aliphatic dicarboxylic acid is a member selected from the group consisting of oxalic acid, succinic acid, adipic acid, azelaic acid and sebacic acid.

5. The polyester powder coating composition according to claim 1, wherein the organic acid anhydride having at least two acid anhydride groups in the molecule is a member selected from the group consisting of pyromellitic dianhydride, 2,3,6,7-nephthalenetetracarboxylic dianhydride, 3,3',4,4'-diphenyltetracarboxylic dianhydride, 2,2',3,3'-diphenyltetracarboxylic dianhydride, 1,2,5,6-naphthalenetetracarboxylic dianhydride, 2,2-bis(3,4-dicarboxyphenyl)propane dianhydride, 1,2,3,-4-cyclopentanetetracarboxylic dianhydride, benzophenonetetracarboxylic dianhydride, bis(3,4-dicarboxyphenyl)ether dianhydride, 3,4,9,10-perylenetetracarboxylic dianhydride, ethylene bis-(trimellitate) dianhydride, hydroquinone bis(trimellitate) dianhydride, bisphenol A bis(trimellitate) dianhydride, p,p'-phenylene bis(thiotrimellitate) dianhydride, glycerine tris(trimellitate) trianhydride, and trimethylolethane trimellitate trianhydride.

6. The polyester powder coating composition according to claim 1, wherein the polyacrylic acid ester is a member selected from the group consisting of poly(methyl acrylate), poly(ethyl acrylate), poly(butyl acrylate), poly(2-ethylhexyl acrylate), poly(methoxyethyl acrylate) and poly(lauryl acrylate).

7. The polyester powder coating composition according to claim 1, which additionally comprises a sulfur-containing compound selected from the group consisting of sodium dimethyldithiocarbamate, zinc dimethyldithiocarbamate, sodium diethyldithiocarbamate, zinc diethyldithiocarbamate, sodium dibutyldithiocarbamate, zinc dibutyldithiocarbamate, calcium dibutyldithiocarbamate, magnesium dibutyldithiocarbamate, tetramethylthiuram monosulfide, tetramethylthiuram disulfide, tetraethylthiuram disulfide, tetrabutylthiuram disulfide, 2-mercaptobenzimidazole, 2-mercaptobenzimidazole sodium, zinc or calcium salt, 2-mercaptoimidazoline, 2-mercaptoimidazoline sodium, zinc or calcium salt, tetramethylthiourea, dibenzylthiourea, dicyclohexylthiourea, di-o-tolylthiourea and ethylenethiourea.

8. The polyester powder coating composition according to claim 7, wherein the sulfur-containing compound is added in a range of 0.1 to 1 part by weight on the basis of 100 parts by weight of the polyester.

* * * * *

UNITED STATES PATENT OFFICE
CERTIFICATE OF CORRECTION

Patent No. 3,867,480    Dated February 18, 1975

Inventor(s) Kanji Fujiyoshi; Yutaka Mizumura; Junji Sono

It is certified that error appears in the above-identified patent and that said Letters Patent are hereby corrected as shown below:

In the title: "POLYESTER POWDER COATING COMPOSITIONS" should read -- POLYESTER POWDER COATING COMPOSITIONS CONTAINING A POLYANHYDRIDE AND A POLYACRYLIC ACID ESTER --

In column 3, line 60, "of" second occurrence should read -- of --

In column 4, line 48, "(a)(ii)" should be -- molecular --.

In column 9, line 16, "commposition" should be -- composition --.

Signed and Sealed this fifth Day of August 1975

[SEAL]

Attest:

RUTH C. MASON
Attesting Officer

C. MARSHALL DANN
Commissioner of Patents and Trademarks